Oct. 20, 1942.  C. S. DRAPER  2,299,081

VIBRATION MEASURING APPARATUS

Original Filed May 18, 1937

FIG. 2 — Torsional Vibration.

pickup coil soft iron armature fixed to body being vibrated.

INVENTOR
CHARLES S. DRAPER
BY Herbert H. Thompson
HIS ATTORNEY.

Patented Oct. 20, 1942

2,299,081

UNITED STATES PATENT OFFICE 2,299,081

VIBRATION MEASURING APPARATUS

Charles S. Draper, Newton, Mass., assignor to Research Corporation, New York, N. Y., a corporation of New York Original application May 18, 1937, Serial No. 143,269. Divided and this application April 1, 1941, Serial No. 386,351

7 Claims. (Cl. 171—209)

This application is a division of U. S. patent application Serial No. 143,269, filed May 18, 1937, now U. S. Patent No. 2,254,172, dated August 26, 1941, for Vibration measuring apparatus. The invention disclosed and claimed herein relates to improvements in apparatus for the measurement of torsional or angular vibration and more particularly to apparatus adapted to furnish an electrical measure of such vibration.

In my copending application, joint with George P. Bentley, now U. S. Patent No. 2,251,436, dated August 5, 1941, there is disclosed novel vibration measuring and recording apparatus adapted for measuring linear vibration of a body. The said apparatus employs an electromagnetic generator having a coil and relatively movable magnet coupled by weak resilient means to provide an instrument having a low natural frequency of vibration so that relative motion of the coil and magnet generates a voltage in the coil proportional to the velocity of the vibratory motion.

The principal object of the present invention is to provide apparatus of similar character for measuring torsional or angular vibration, such as that of a rotating shaft, by converting a portion of the vibrational energy into electrical energy, which may be conveniently used for indicating or recording purposes.

Another object is the provision of apparatus of the above character which does not affect the vibration characteristics of the member investigated and which permits the measurement and recording of torsional vibration at one or more remote points by a central unit or units.

Still another object of the present invention is to provide novel vibration measuring apparatus, including an electromagnetic generator supplying an output voltage proportional to the velocity of the vibration being measured, which voltage may be applied to an integrating circuit for securing a measure of the displacement or amplitude of the vibration and thereby an indication which is independent of frequency.

A further object is to provide apparatus of the above type which supplies an accurate measure of torsional vibrations of frequencies above a known lower limit.

Other objects and advantages of this invention will become apparent as the description proceeds.

In the drawing,

Fig. 2 is a sectional perspective view of a complete torsional vibration pick-up unit.

Figure 1:
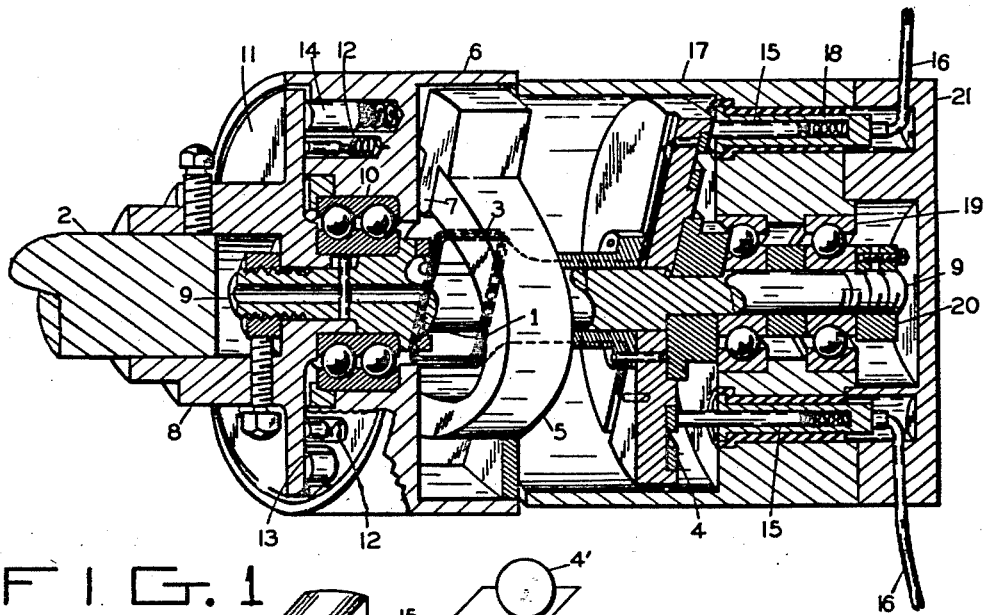
Fig. 1 is a perspective schematic view of a magnetic generator adapted for use as a torsional vibration pick-up.
Figure 1:
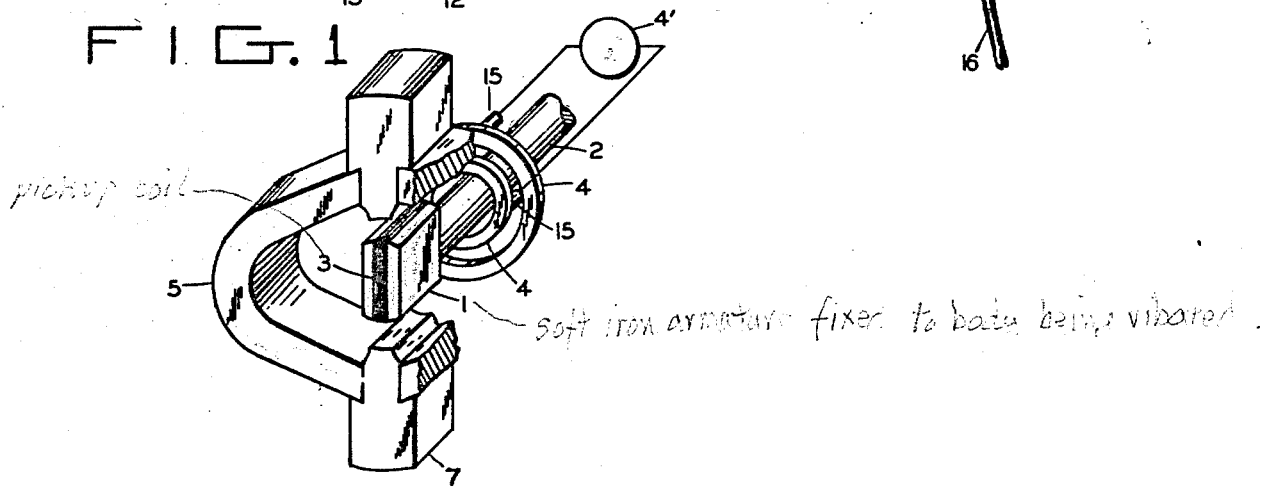

Referring now to Fig. 1, there is shown schematically a torsional vibration pick-up unit having an armature 1 of high permeability material such as iron or a ferrous alloy, the said armature being adapted for rigid attachment to a shaft 2, such as the crank shaft of an internal combustion engine whose torsional vibrations are to be measured. A coil of fine wire 3 is wound in a suitable centrally positioned recess in armature 1 and electrically insulated from the armature. Connections to coil 2 are brought out by way of slip rings 4. A magnet assembly comprising a pair of horse shoe permanent magnets 5 and a pair of pole pieces 7 is mounted with the air gap between said pole pieces, and in which said armature is positioned, coaxial with shaft 2 and said assembly is restrained from rotation relative to the shaft by weak springs (not shown in Fig. 1). Said springs serve to couple the magnet 5 resiliently to the shaft 2 and position the magnet structure so that the arcuate inner surfaces of pole pieces 7 are normally symmetrically disposed with respect to armature 1. Oppositely positioned pole pieces 7 are of opposite polarity and due to the described symmetrical arrangement the portions of armature 1 on opposite sides of coil 3 normally carry equal amounts of flux. The air gap between armature 1 and the pole pieces 7 is made very small so that two low reluctance flux paths are thus provided for the flux on opposite sides of coil 3. This air gap has been greatly enlarged in the picture to facilitate the illustration.

Due to the presence of the aforementioned weak coupling springs the structure comprising magnets 5 and pole pieces 7 rotates with a substantially constant angular velocity which is the average velocity of shaft 2, any tendency of the magnet structure to vibrate freely at its own natural frequency or at frequencies adjacent thereto being substantially prevented by damping means later to be described. This natural frequency of vibration is determined by the moment of inertia of the magnet structure, together with parts rigidly connected thereto, and the elasticity of the coupling springs. By a suitable choice of constants the torsional vibration of shaft 2, when it occurs at a frequency higher than approximately two or three times the natural frequency of the moving system, produces relative motion between armature 1 and magnet 5 substantially equal to the magnitude of the vibration, resulting in a proportional transfer of flux from one side of armature 1 across coil 3 to the other side. Such flux transfer relative to coil 3 induces a voltage in the coil proportional to the rate at which flux crosses the coil, and this voltage is therefore proportional to the velocity of torsional vibration of the shaft.

The voltage induced in coil 3 is applied to an external circuit such as torsional vibration velocity indicator 4', which may be of the voltmeter type, through slip rings 4. The magnet structure is one capable of being highly magnetized and owing to the small air gap employed a high flux density is obtained through armature 1 and pole pieces 7. The relative movement of armature and magnet poles therefore induces relatively high potentials in coil 3 so that this electromagnetic pick-up unit is highly sensitive and efficient in use, a small unit providing a relatively large voltage output.

Should it be desired to indicate the magnitude of the torsional vibrational displacement of shaft 2 rather than the velocity of the vibration, the output voltage obtained at slip rings 4 may be applied to an integrating circuit and by the process of integration a voltage proportional to vibrational amplitude may be derived from the velocity output. Integrating circuits suitable for connection to the pick-up of the present invention are known in the art and are shown and described in my prior joint application, now U. S. Patent No. 2,251,436, previously referred to. Likewise, should it be desired to indicate the acceleration of the torsional vibration of the shaft, the output voltage at slip rings 4 may be applied to a differentiating circuit such as is also shown and described in my previously mentioned joint application and various types of which are known in the art. By differentiation a voltage proportional to vibrational acceleration is thus derived.

In Fig. 2, there is shown a practical construction of torsional pick-up incorporating the principles of Fig. 1 and parts of Fig. 2 corresponding to Fig. 1 are similarly numbered. In this figure, the "seismic" element, which is that part of the pick-up rotating at a constant angular velocity, consists of a cylindrical member 6 which may be of brass and which rigidly supports permanent magnets 5 and pole pieces 7, the magnets being poled and positioned to induce poles of opposite sign in the two pole pieces. The pick-up unit is attached to shaft 2 by means of a flanged collar 8 and a shaft 9 preferably of bronze is secured to collar 8 for coaxial rotation with shaft 2. Shaft 9 is journalled in ball bearing 10 which is housed in cylindrical member 6 of the "seismic" element. Cylinder 6 is coupled to flange 11 of collar 8 through weak springs 12 having their ends connected to flange 11 and cylinder 6, respectively. The "seismic" element comprising cylinder 6 together with the magnet assembly mounted on it and springs 12 constitute an oscillatory system whose natural frequency of vibration as determined by the moment of inertia and elasticity of its moving elements is materially lower than the frequency of any vibration to be measured. As noted above, the relative displacement of parts in such a system is proportional to vibrational amplitude, the electrical output of the generator actuated thereby being proportional to vibrational velocity.

Relative motion between the seismic element and flange 11 is limited to a small angle by a pin 13 carried by flange 11 and projecting into a slot in cylinder 6 to avoid swings of excessive amplitude due to resonance effects or shock. A spring pressed plug 14 of suitable friction material is carried by cylinder 6 and engages flange 11 to furnish the desired damping of the oscillatory system. It will be apparent that a change of damping constant may be obtained by changing the strength of the spring engaging plug 14. Armature 1, which is mounted on shaft 9, carries coil 3, connected electrically to slip rings 4 and brushes 15 and thence to leads 16. A housing 17 which may be of aluminum to reduce its weight supports brush holders 18 and is mounted on shaft 9 by means of ball bearings 19. Housing 17 is stationary and therefore does not constitute a part of the seismic element. The brush assembly is held in place by a split clamp nut 20 and an insulating cap 21 overlies the end of the structure and holds leads 16 in place.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A means for converting energy of vibratory angular motion about a given axis into electric energy, comprising, in combination, a shaft rigidly connected to the vibrating structure, a balanced mass mounted on bearings coaxially with said shaft and restrained to rotate with the mean angular velocity of said shaft by springs disposed between said mass and said shaft, magnet means secured to said mass having magnet poles symmetrically disposed on either side of the axis of said shaft and mass, an armature of material having a magnetic permeability high compared to that of air secured to said shaft, said armature having a recess, a coil mounted on said armature in said recess and electrically insulated from the armature, said armature and coil being so disposed between poles of said magnet that relative motion between said mass and said armature causes a transfer of flux from a portion of said armature on one side of said recess to a portion on the other side, thereby resulting in a change of flux through said coil and generating an induced voltage substantially proportional to the velocity of relative motion between said mass and said armature, said voltage being therefore substantially proportional to the vibratory angular motion of this shaft above a certain frequency.

2. Apparatus for measuring torsional vibration comprising a rotatable armature, a coil mounted on said armature, a coaxially mounted field magnet rotatable relative to said armature, and resilient means coupling said armature and field magnet, said members being so constructed and arranged that relative torsional vibration of said armature and magnet causes a change in the distribution of flux relative to said coil and thereby generates a voltage in said coil proportional to said vibration.

3. A device for measuring the angular vibration of a rotating body about the axis of rotation thereof comprising an armature assembly adapted to be mounted on and directly rotated by said body about said axis, said assembly including a permeable core and a relatively thin coil mounted thereupon substantially in a plane through said axis, a field magnet mounted for rotation about said axis and having pole pieces of opposite polarity arranged to create flux in said armature, a resilient coupling between said armature and magnet, said coupling normally centralizing said coil relative to said pole pieces, whereby angular vibration of said body causes a voltage proportional to the velocity of said vibration to be generated in said coil.

4. A device for measuring the angular vibration of a rotating body about the axis of rotation thereof comprising an armature assembly adapted to be mounted on and directly rotated by said body about said axis, said assembly including a permeable core and a relatively thin coil mounted thereupon substantially in a plane through said axis, a field magnet assembly having a relatively high moment of inertia mounted for rotation about said axis, a weak resilient coupling between said armature and magnet, said coupling normally centralizing said coil relative to said pole pieces, whereby angular vibration of said body causes relative angular displacement between said armature and magnet proportional to the amplitude of said vibration and thereby generates a voltage in said coil proportional to the velocity of said vibration.

5. In apparatus for measuring the motional characteristics of a rotating body, a magnet member having a flux-permeated air gap, an armature member centrally located in said gap, means for rigidly mounting one of said two members on said body for rotation therewith, means mounting the other of said members on said one member for rotation relative thereto about the rotational axis thereof, a weak resilient coupling between said two members resisting angular displacement therebetween and a coil mounted on said armature member for generating an E. M. F. responsive to change of relative angular position of said two members.

6. In apparatus for measuring torsional vibration, a magnet having a flux-permeated air gap, an armature centrally located in said gap, means mounting said magnet and armature for relative rotation about an axis perpendicular to the direction of the magnetic field in said gap, a coil on said armature positioned with its axis perpendicular to said rotational axis and normally perpendicular to said field, a resilient coupling resisting relative displacement of said magnet and armature about said rotational axis, and means for rigidly mounting one of said relatively displaceable members on a rotating body to be driven thereby.

7. In apparatus for measuring the motional characteristics of a rotating body, a magnet member having a flux-permeated air gap, an armature member centrally located in said gap, means for rigidly mounting one of said two members on said body for rotation therewith, means mounting the other of said members on said one member for rotation relative thereto about the rotational axis thereof, a weak resilient coupling between said two members resisting angular displacement therebetween, a coil mounted on said armature member for generating an E. M. F. responsive to change of relative angular position of said two members, and means for damping relative oscillation of said two members.

CHARLES S. DRAPER.